US011863003B2

United States Patent
Kwon

(10) Patent No.: US 11,863,003 B2
(45) Date of Patent: Jan. 2, 2024

(54) POWER CONVERTING DEVICE, AND ENERGY STORAGE APPARATUS INCLUDING THE SAME

(71) Applicant: LG ELECTRONICS INC., Seoul (KR)

(72) Inventor: Namyeol Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 17/191,267

(22) Filed: Mar. 3, 2021

(65) Prior Publication Data
US 2021/0281094 A1    Sep. 9, 2021

(30) Foreign Application Priority Data
Mar. 4, 2020  (KR) .................. 10-2020-0027359

(51) Int. Cl.
  *H02J 7/00*   (2006.01)
  *H02J 3/00*   (2006.01)
  *H02M 3/155*  (2006.01)
  *H02J 3/32*   (2006.01)

(52) U.S. Cl.
  CPC ............ *H02J 7/0068* (2013.01); *H02J 3/007* (2020.01); *H02J 3/32* (2013.01); *H02J 7/0063* (2013.01); *H02M 3/155* (2013.01); *H02J 2207/20* (2020.01); *H02J 2300/24* (2020.01)

(58) Field of Classification Search
  USPC ........ 320/101, 106, 107, 108, 109, 110, 137
  See application file for complete search history.

(56) References Cited

U.S. PATENT DOCUMENTS

| | | | | |
|---|---|---|---|---|
| 10,892,682 B2* | 1/2021 | Dilley | ................... | H02M 7/797 |
| 2011/0273130 A1* | 11/2011 | Lee | ........................... | H02J 3/44 |
| | | | | 320/101 |
| 2012/0013175 A1* | 1/2012 | Newman, Jr. | ......... | B60R 16/033 |
| | | | | 320/109 |
| 2014/0361725 A1* | 12/2014 | Nishikawa | ................ | H02J 7/35 |
| | | | | 320/101 |

FOREIGN PATENT DOCUMENTS

KR        2011/0273130        11/2011

* cited by examiner

*Primary Examiner* — Brian Ngo
(74) *Attorney, Agent, or Firm* — KED & ASSOCIATES, LLP

(57) ABSTRACT

A power converting device, such as one used in an energy storage apparatus, comprises a first input terminal to receive a first DC voltage from a battery, a second input terminal to receive a second DC voltage from a power generation device, a switching module including a plurality of upper arm switching elements and a plurality of lower arm switching elements, and to output DC voltage to a DC link by switching the first DC voltage or the second DC voltage, and, a DC link capacitor disposed at the DC link, wherein at least some of the plurality of lower arm switching elements of the switching module operate in a power generation mode of the power generation device, and at least some of the plurality of upper arm switching elements of the switching module operate in a charging mode of the battery.

19 Claims, 12 Drawing Sheets

FIG. 4

| R1 | R2 | Mode |
|----|----|------|
| 0 | 0 | Standby |
| 0 | 1 | PV,charging |
| 1 | 0 | discharging |
| 1 | 1 | disabled | ions

POWER CONVERTING DEVICE, AND ENERGY STORAGE APPARATUS INCLUDING THE SAME

CROSS-REFERENCE TO RELATED APPLICATION

This application claims priority under 35 U.S.C. § 119 to Korean Application No. 10-2020-0027359 filed on Mar. 4, 2020, whose entire disclosure is hereby incorporated by reference.

BACKGROUND

1. Field

The present disclosure relates to a power converting device, and energy storage apparatus including the same and, more particularly, to a power converting device capable of operating a common switching module even for multiple DC voltage sources, and energy storage apparatus including the same.

2. Background

An energy storage apparatus is an apparatus that receives and stores external power and then externally outputs the stored power. To this end, the energy storage apparatus may include a battery, and a power converting device may be used to covert power supplied to the battery or to convert power outputted from the battery. Meanwhile, multiple direct current (DC) voltage sources may be used for supplying power to an energy storage apparatus, but when a separate switching module is configured for each DC voltage source, the size and cost of the power converting device in the energy storage apparatus may increase.

Korean Patent Publication No. 10-2011-0123130 describes a solar power conditioning system (PCS)-integrated bi-directional battery charging and discharging system. This system may have a large and costly power converting device that includes a first DC/DC converter unit that converts the power of a photovoltaic (PV) cell and a separate second DC/DC converter that converts the power of a battery. The above-reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 4 to 10 are views referenced for description of the power converting device of FIG. 3A.

DETAILED DESCRIPTION

Reference will now be made in detail to embodiments, examples of which are illustrated in the accompanying drawings. However, the present disclosure may be embodied in many different forms and should not be construed as being limited to the embodiments set forth herein. Meanwhile, in the following description, with respect to constituent elements used in the following description, the suffixes "module" and "unit" are used or combined with each other only in consideration of ease in preparation of the specification, and do not have or indicate mutually different meanings. Accordingly, the suffixes "module" and "unit" may be used interchangeably.

Figure 1:
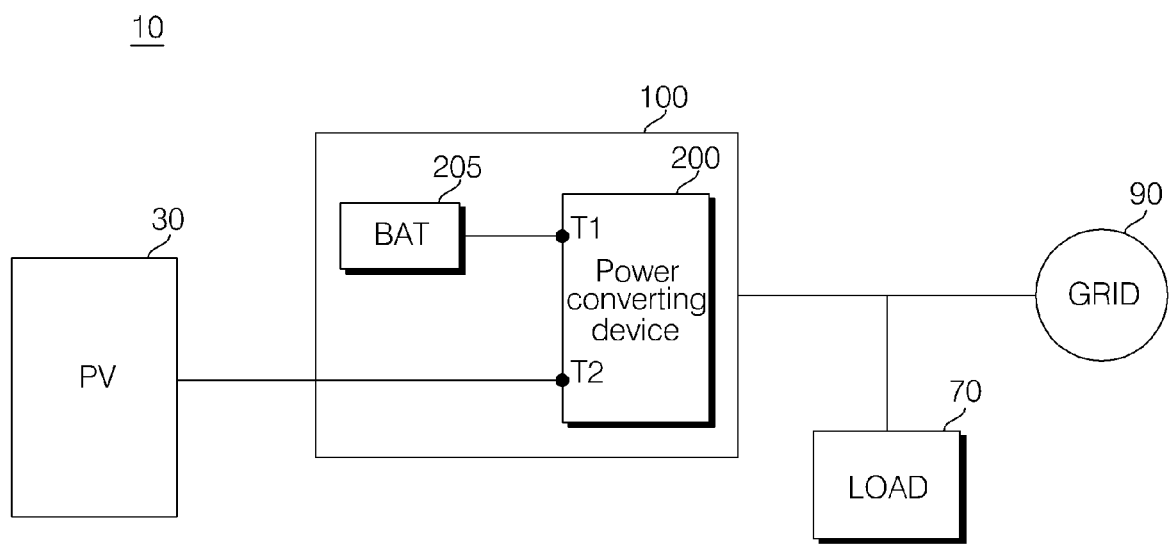
FIG. 1 is a view showing a power converting system according to an embodiment of the present disclosure.

FIG. 1 is a view showing a power converting system according to an embodiment of the present disclosure. Referring to the drawings, a power converting system 10 according to an embodiment of the present disclosure may include at least one power generation device 30, an energy storage apparatus 100, and the like.

The power converting system 10 according to an embodiment of the present disclosure may further include one or more of a load 70 or a grid 90 that receive power from the energy storage apparatus 100. The load 70 is a device or component that consumes power of the power converting system 10 and may be located relatively close to the power converting system 10 (e.g., in the same building). For example, the load 70 may include a refrigerator, a washing machine, an air conditioner, a TV, a robot cleaner, a home appliance such as a robot, or a mobile electronic device such as a vehicle or a drone.

The power generation device 30 may include, for example, a photovoltaic (PV) device that outputs DC voltage that is generated using solar power. However, the power converting system 10 may include a different type of power generation device 30 or may include multiple different types of power generation devices 30. For example, power generation device 30 may be at least one of the PV device, a wind power generation device (or windmill) that outputs DC voltage using wind power, a hydraulic power generation device that outputs DC voltage using water movement, a tidal power generation device that outputs DC voltage using tidal flow, or a thermal power generation device that outputs DC voltage using heat such as geothermal heat. Hereinafter, the power generation device 30 is mainly described as a photovoltaic device for convenience of explanation.

The energy storage apparatus 100 may store external power, such as to a battery or other power storage device, and then output power to the outside (e.g., to load 70 and/or grid 90). For example, the energy storage apparatus 100 may receive DC voltage or alternating current (AC) voltage from the outside, store it in a battery, etc., and then output DC voltage or AC voltage to the outside. Meanwhile, since the battery 205 mainly stores DC voltage, the energy storage apparatus 100 mainly may receive DC voltage from at least one DC voltage source, store it in the battery 205, and convert the stored DC voltage in the battery 205 into AC voltage and supply to the grid 90 or the load 70.

At this time, the power converting device 200 in the energy storage apparatus 100 may receive DC voltage from the outside or DC voltage from the battery 205, perform power conversion, and charge the battery 205 or supply DC voltage stored in the battery 205 to the grid 90 or the load 70, according to the power conversion. In particular, when DC voltage is input from a plurality of DC voltage sources to the power converting device 200 in the energy storage apparatus 100, if a separate switching module in the power converting device is used for each power conversion, there may be problems such as an increase in the size and cost of the power converting device. Accordingly, the present disclosure provides a power converting device 200 that can commonly operate in a power generation mode of the power generation device 30, a charging mode of the battery 205, and the like using a single switching module.

To this end, the power converting device 200 may include a first input terminal T1 configured to receive a first DC voltage from the battery 205, and a second input terminal T2 configured to receive a second DC voltage from the power generation device 30. The power converting device 200 may further include a switching module (also referred to herein as insulated bipolar transistors or IBT) that includes a plurality of upper arm switching elements (or first switches) Qa, Qb and a plurality of lower arm switching elements (or second switches) Q'a, Q'b, and outputs direct current (DC) power to the DC link (a-b terminal) (or DC terminal) by switching the first or second direct current power and a DC link capacitor C disposed at the DC link (a-b terminal).

At least some of the plurality of lower arm switching elements Q'a and Q'b of the switching module IBT may operate in a power generation mode of receiving power from the power generation device 30, and at least some of the plurality of upper arm switching elements Qa and Qb of the switching module IBT may operate in a charging mode of the battery 205. Accordingly, it is possible to operate the common switching module IBT even for a plurality of DC voltage sources. In addition, it is possible to implement the compact power converting device 200 in a plurality of DC voltage sources. Meanwhile, the switching module IBT may further operate in the power generation mode of the power generation device 30, in the charging mode of the battery 205, in the discharging mode of the battery 205, or in the grid charging mode. Accordingly, since the common switching module IBT may be operated even for a plurality of DC voltage sources, a compact power converting device 200 can be implemented.

Figure 2A:
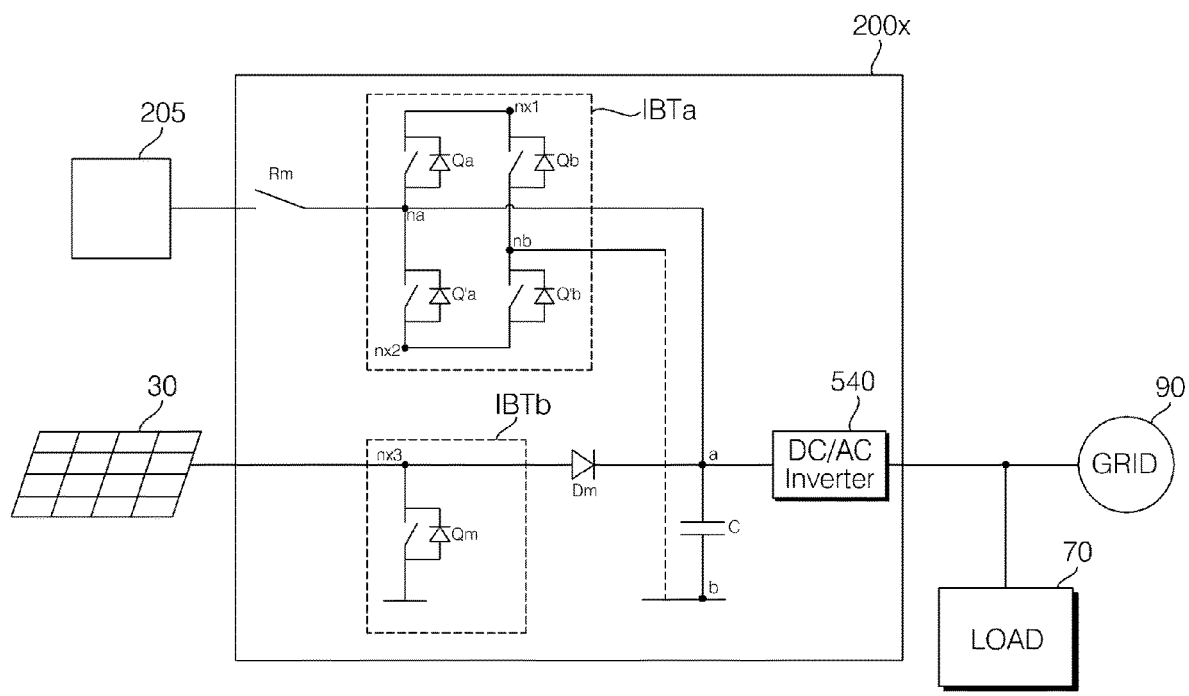
FIGS. 2A and 2B are views showing a power converting device related to the present disclosure.
Figure 2B:
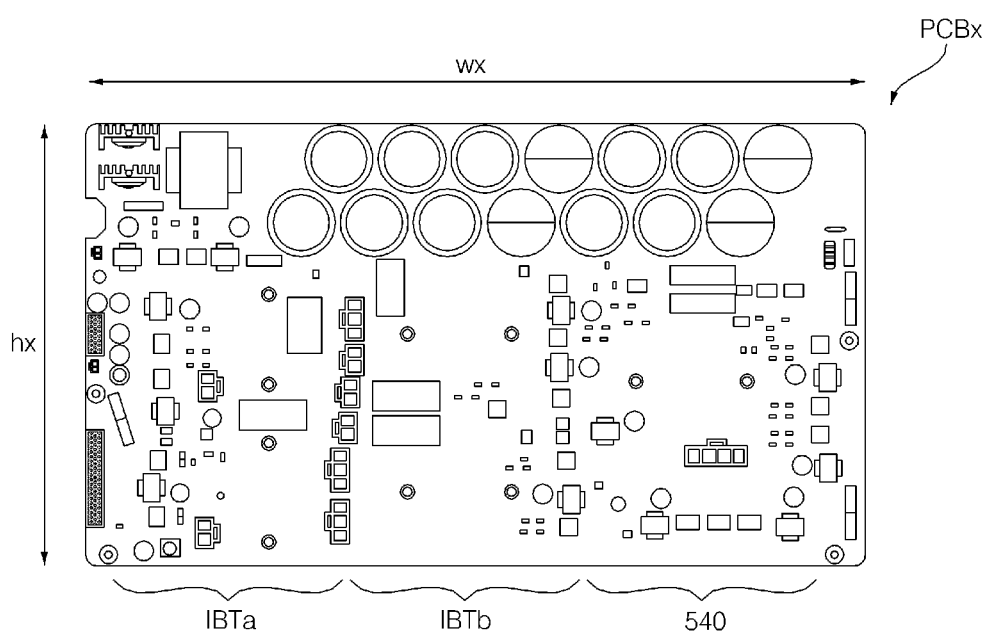

FIGS. 2A and 2B are views showing a power converting device related to the present disclosure. Referring to the drawings, a power converting device 200x related to the present disclosure may receive DC voltage from the battery 205 or DC voltage from the power generation device 30 (such as a PV device). That is, DC voltage may be respectively input into power converting device 200x from two DC voltage sources.

The power converting device 200x includes a first switching module IBTa for power conversion of the DC voltage from the battery 205, and a second switching module IBTb for power conversion of the DC voltage from the power generation device 30. For example, the first switching module IBTa operates in the discharging mode or charging mode of the battery 205, and the second switching module IBTb operates in the power generation mode of the power generation device 30. In addition, the first switching module IBTa operates in the grid charging mode in which power is output from power converting device 200x.

FIG. 2B is a schematic view of the size of the power converting device of FIG. 2A. Referring to the drawing, since the circuit board PCBx of the power converting device 200x includes a first switching module IBTa, a second switching module IBTb, and an inverter 540, the width is approximately wx (reflecting a combination of a first width of the first switching module IBTa, a second width of the second switching module IBTb and the third width of the inverter 540), and the height is approximately hx. In this way, when the power converting device 200x is provided with the first switching module IBTa and the second switching module IBTb corresponding to the number of input DC voltage sources, the size of the power converting device 200x becomes large, and a failure of any one of the switching modules module IBTa and IBTb causes the entire power converting device to not operate, resulting in a deterioration in durability.

Accordingly, the present disclosure proposes a power converting device 200 that may commonly operate in a power generation mode of the power generation device 30, a charging mode of the battery 205, and the like using one switching module. This power converting device configuration will be described with reference to FIG. 3A.

Figure 3A:
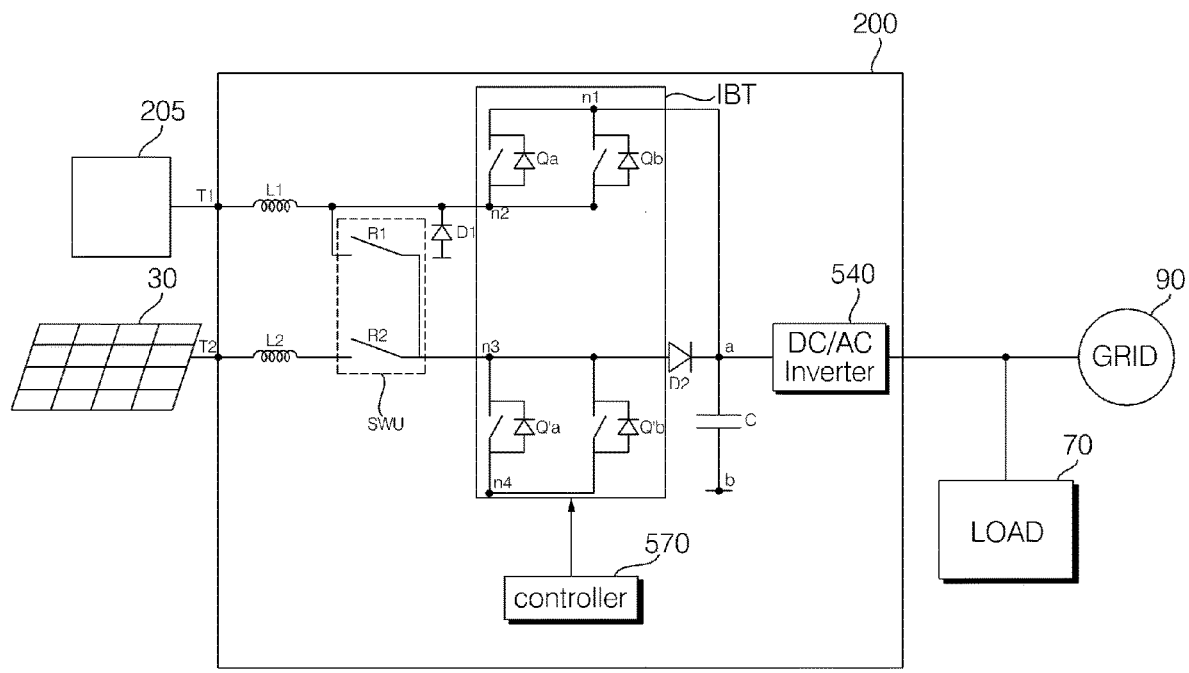
FIG. 3A is a view showing a power converting device according to an embodiment of the present disclosure.

FIG. 3A is a view showing a power converting device according to an embodiment of the present disclosure. First, referring to FIG. 3A, a power converting device 200 according to an embodiment of the present disclosure includes a first input terminal T1 configured to receive a first DC voltage from a battery 205 and a second input terminal T2 configured to receive a second DC voltage of a power generation device 30, a switching module IBT including a plurality of upper arm switching elements (or first switching elements) Qa, Qb and a plurality of lower arm switching elements (or second switching elements) Q'a, Q'b, and configured to switch between the first DC voltage or the second DC voltage, to output DC voltage to the DC link (a-b terminal), and a DC link capacitor C disposed at the DC link (a-b terminal).

In the power converting device 200 according to the embodiment of the present disclosure, at least some of the plurality of lower arm switching elements Q'a and Q'b of the switching module IBT may operate in the power generation mode of the power generation device 30, and at least some of the plurality of upper arm switching elements Qa and Qb of the switching module IBT may operate in the charging mode of the battery 205. Accordingly, it is possible to operate the common switching module IBT even for a plurality of DC voltage sources. In addition, it is possible to implement the compact power converting device 200 in a plurality of DC voltage sources.

Meanwhile, the power converting device 200 according to an embodiment of the present disclosure may further include a first relay element (or first relay switch) R1 disposed between the first input terminal T1 and the switching module IBT, and a second relay element (or second relay switch) R2 disposed between second input terminal T2 and the switching module IBT. While the drawings show a single battery 205 connected to the power converting device 200, it is should be appreciated that multiple batteries 205 may be connected to the power converting device 200, and the power converting device 200 may include multiple first input terminals T1 electrically coupled to respective first relay elements R1. Similarly, while the drawings show a single power generation device 30 connected to the power converting device 200, it is should be appreciated that multiple power generation devices 30 may be connected to the power converting device 200, and the power converting device 200 may include multiple second input terminals T2 electrically coupled to respective second relay elements R2.

Meanwhile, the switching module IBT may include first and second upper arm switching elements Qa and Qb connected in parallel between a first node n1 and a second node n2, and first and second lower arm switching elements Q'a and Q'b connected in parallel between a third node n3 and a fourth nodes n4. The operations of first and second upper arm switching elements Qa and Qb and first and second lower arm switching elements Q'a and Q'b with respect to first-fourth nodes n1-n4 are discussed in greater detail below. One end of the first and second relay elements R2 may be commonly connected to a third node n3 in the switching module IBT.

Meanwhile, the power converting device 200 according to an embodiment of the present disclosure may further include a first inductor L1 disposed between the first input terminal T1 and the second node n2, and a second inductor L2 disposed between a second input terminal T2 and the third node n3. The power converting device 200 may further include a first diode D1 disposed between the second node n2 and ground GND, and a second diode D2 disposed between a third node n3 and one end of the DC link capacitor C.

Meanwhile, the power converting device 200 according to an embodiment of the present disclosure may further include a bidirectional inverter (also referred as a DC/AC inverter) 540 configured to convert the DC voltage of the DC link (a-b terminal) into AC voltage and output the converted AC voltage. The inverter 540 may further convert external AC voltage into DC voltage, such as to provide charging power to the battery 205.

Meanwhile, the power converting device 200 according to an embodiment of the present disclosure may further include a controller 570 configured to control a switching module IBT and/or the bidirectional inverter 540. For example, the controller 570 may further control the first relay element R1 and the second relay element R2.

Meanwhile, when controller 570 causes the first relay element R1 to be turned off and the second relay element R2 to be turned on, the DC voltage converted through the second relay element R2 and the third node n3 output to the DC link capacitor C, or the DC voltage stored in the DC link capacitor C is charged into the battery 205 through the first node n1. Accordingly, it is possible to perform a discharging mode or a charging mode of the battery 205 by using the compact power converting device 200.

Meanwhile, the controller 570 may control at least some of the plurality of lower arm switching elements Q'a and Q'b of the switching module IBT to operate in the power generation mode of the power generation device 30, and at least some of the plurality of upper arm switching elements Qa and Qb of the switching module IBT to operate in the charging mode of the battery 205. For example, the controller 570 may control at least some of the plurality of upper arm switching elements Qa, Qb of the switching module IBT or at least some of a plurality of lower arm switching elements Q'a, Q'b of the switching module IBT to operate in the discharging mode of the battery 205. Accordingly, it is possible to operate the common switching module IBT even for a plurality of DC voltage sources. The controller 570 may similarly control at least some of the plurality of upper arm switching elements Qa and Qb of the switching module IBT to operate in the grid charging mode or the charging mode of the battery 205.

Meanwhile, the controller 570 may control the switching module IBT to be operated in the power generation mode of the power generation device 30, the charging mode of the battery 205, the discharging mode of the battery 205, or the grid charging mode. Accordingly, since the common switching module IBT may be operated even for a plurality of DC voltage sources, a compact power converting device 200 can be implemented.

Figure 3B:
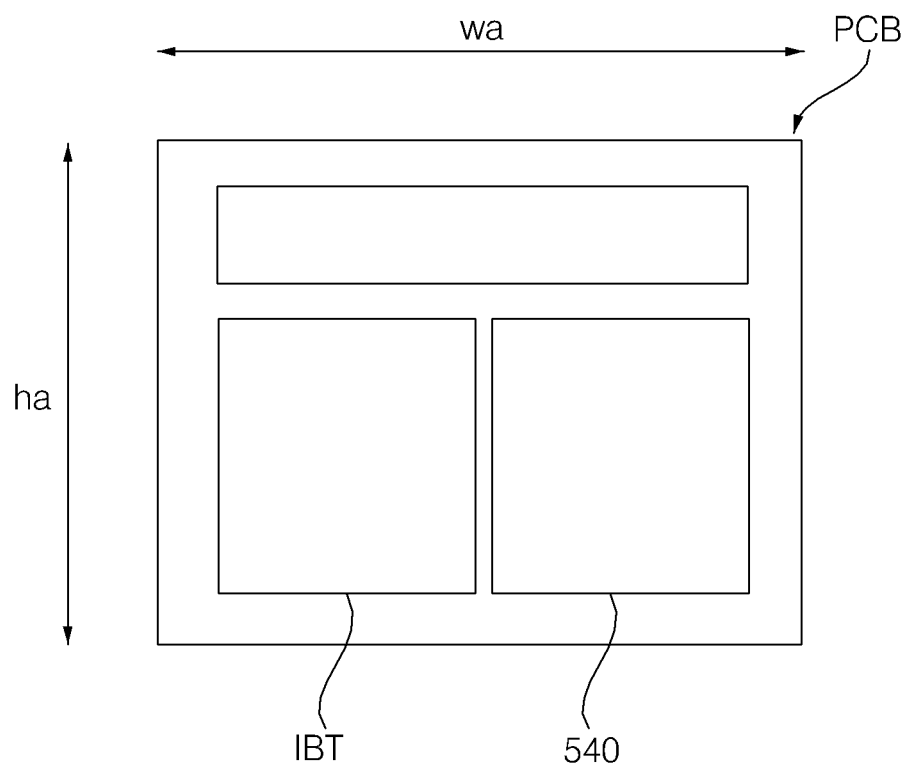
FIG. 3B is a view schematically showing the size of the power converting device of FIG. 3A.

FIG. 3B is a view schematically showing the size of the power converting device of FIG. 3A. Referring to the drawings, in contrast the FIG. 2A, a circuit board PCB of the power converting device 200 includes only one switching module IBT.

That is, the circuit board PCB of the power converting device 200 includes one switching module IBT and an inverter 540. Accordingly, the width is approximately wa (reflecting, for example, a combination of a first width of the IBT 200 and a second width of the DC/AC inverter 5400, and the height is approximately ha. That is, the width Wa of the circuit board PCB of the power converting device 200 of FIG. 3B may be smaller than the width wx of FIG. 2B. Therefore, it is possible to implement a compact power converting device.

FIGS. 4 to 10 are views referenced for description of the power converting device of FIG. 3A. First, FIG. 4 is a table showing a different operation modes of the power converting device 200 according to the operation of the first relay element R1 and the second relay element R2. The operation modes may include a power generation mode, a charging mode, a discharging mode, a disable mode, and the like, and these modes will be described in more detail with reference to FIG. 6 below.

Referring to the drawings, when the controller 570 causes the first relay element R1 and the second relay element R2 to both be turned off concurrently, a standby mode is performed. The standby mode is described in greater detail below.

Next, when the first relay element R1 is turned off and the second relay element R2 is turned on, DC voltage from the power generation device 30 is input to the switching module IBT, and accordingly, a power generation (or PV) mode or a charging mode may be performed. That is, when the power generation device 30 is electrically connected via the second relay element R2 to the switching module IBT, the DC voltage from the power generation device 30 may be directed through the third node n3 in the switching module IBT, and may be stored in the DC link capacitor C. In the power generation mode, the inverter 540 operates in the forward direction to convert stored power from the DC link capacitor C, and the converted power may be outputted, through the inverter 540, to load 70 or the grid 90. Meanwhile, when the inverter 540 is not operated while the first relay element R1 is turned off and the second relay element R2 is turned on, a battery charging mode may be performed, and in the battery charging mode, the voltage stored in the DC link capacitor C (e.g., from the power generation device 30) is directed to the battery 205 through the first node n1 in the switching module IBT.

Next, when the first relay element R1 is turned on and the second relay element R2 is turned off, a battery discharging mode is performed, in which the battery 205 is electrically connected via the first relay element R1 to the switching module IBT so that the voltage stored in the battery 205 is output through the third node n3 in the switching module IBT to the DC link capacitor C. The inverter 540 may then operate to convert stored power from the DC link capacitor C, and the converted power may be outputted to load 70 or the grid 90.

Meanwhile, if both the first relay element R1 and the second relay element R2 are concurrently turned on by the controller 570, there is a possibility of a short occurring between the battery 205 and the power generation device 30 (e.g., such that power bypasses the switching module IBT). In this condition, the power device 200 should enter a disabled state.

Figure 5:
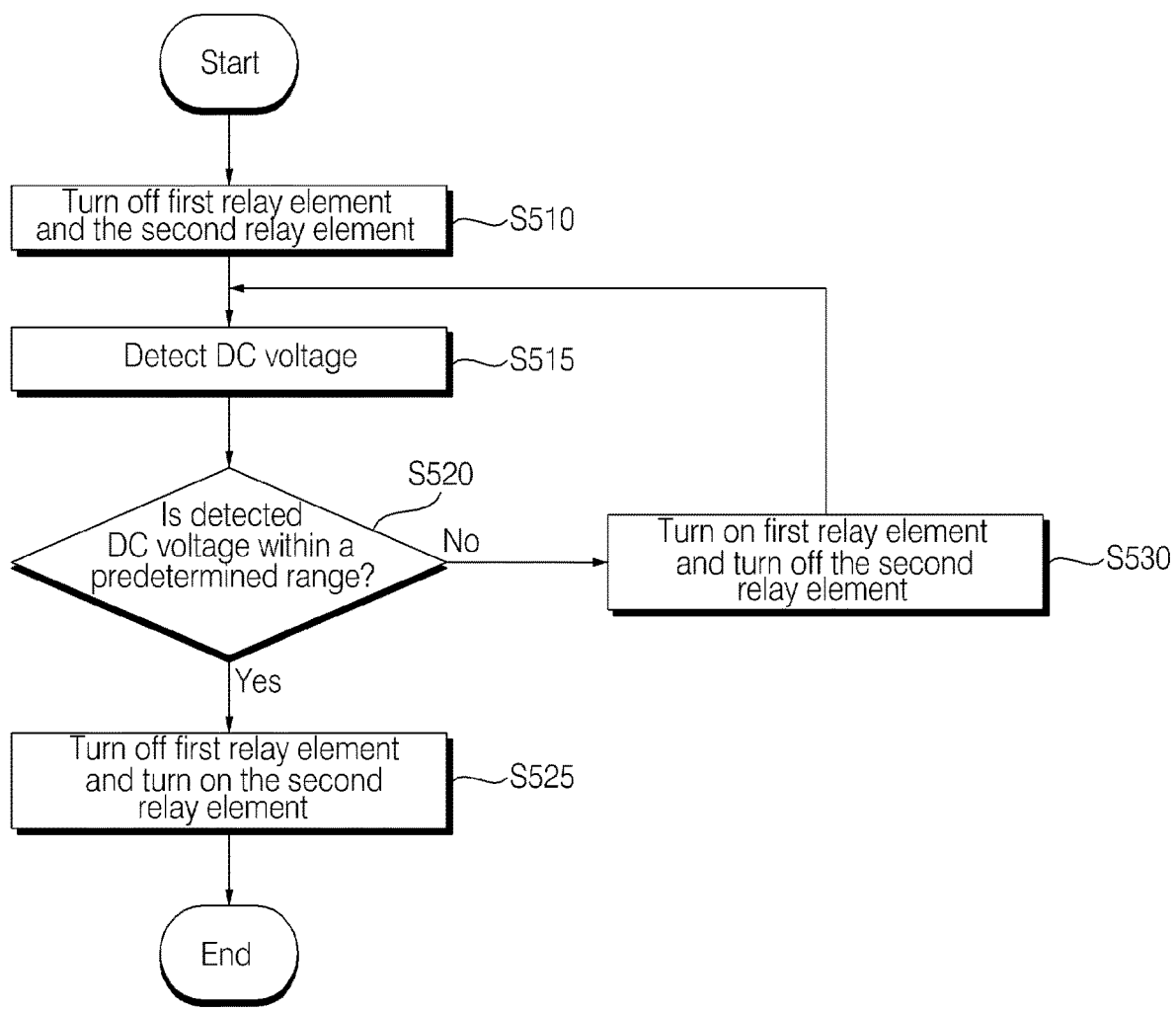

FIG. 5 is a flow chart illustrating a method of operating a power converting device according to an embodiment of the present disclosure. Referring to the drawings, the first relay element R1 in the power converting device 200 is turned off, and the second relay element R2 is turned off (S510). Accordingly, the standby mode is performed.

At this time, the power converting device 200 detects the level of the DC voltage from the power generation device 30

(S515). For example, a voltage detector in the power converting device 200 may be disposed between the second input terminal T2 (e.g., a terminal between the power converting device 200 and the power generation device 30) and the second inductor L2 of FIG. 3A.

Meanwhile, the voltage detected by the voltage detector (not shown) in the power converting device 200 may be input to the controller 570. In another example, the power converting device 200 may be configured to provide an electrical path from a point between the second input terminal T2 and the second inductor L2 to the controller 570, and the controller 570 may evaluate a voltage via this path. The controller 570 determines whether the voltage from the power generation device 30 is within a predetermined range (S520). Here, the predetermined range may correspond to a normal operating range of the power generation device 30 (e.g., the power generation device 30 is operating to generate a desired range of DC voltages).

Meanwhile, when the voltage from the power generation device 30 is within the predetermined range, the controller 570 turns off the first relay element R1 and turns on the second relay element R2 so that the power generation mode and/or the charging mode is performed (S525). In one example, when performing the power generation mode, the controller 570 may further control, in addition to turning off the first relay element R1 and turning on the second relay element R2, the lower arm switching of the switching module IBT such that at least some of the elements Q'a and Q'b to operate to direct DC power from the power generation device 30 to the DC link capacitor C. Accordingly, the second DC voltage from the power generation device 30 is boosted, so that the boosted DC voltage may be output to the DC link capacitor C.

Meanwhile, when the voltage detected by the voltage detector (not shown) is out of a predetermined range in step S520 (e.g., insufficient power is generated by the power generation device 30 of a PV device when light from the sun is blocked), the controller 570 may control the first relay element R1 to be turned on and the second relay element R2 to be turned off so that the discharging mode, etc. is performed (S530). Accordingly, the battery discharging mode is performed, and the voltage stored in the battery 205 may be output to the DC link capacitor C through the third node n3 in the switching module IBT.

Figure 6:
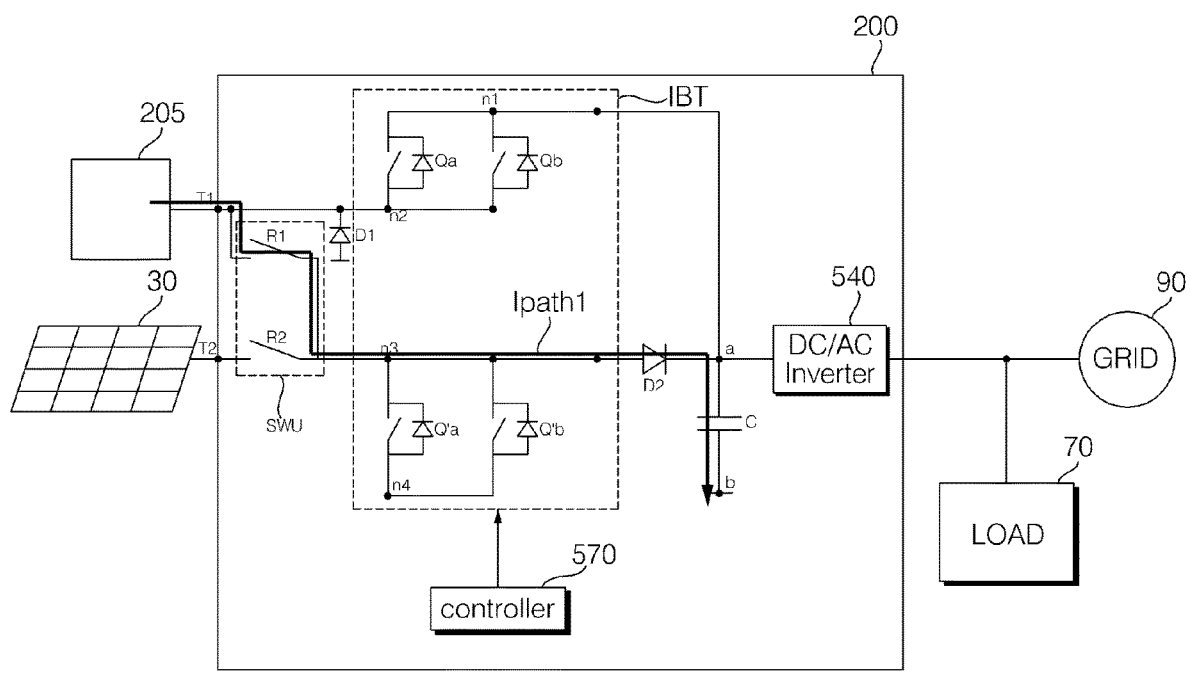

FIGS. 6 to 10 are views referred to for explanation of various modes of the power converting device. First, FIG. 6 is a view showing an initial charging mode of a DC link capacitor of the power converting device 200. Referring to the drawing, the controller 570 may control the first relay element R1 to be turned on and the second relay element R2 to be turned off (e.g., the discharging mode). When the first relay element R1 is turned on and the second relay element R2 is turned off, the first DC voltage of the battery 205 is transferred to the DC link capacitor C through the first inductor L1, the first relay element R1, the third node n3, and the second diode D2 according to the current path of Ipath1. Therefore, initial charging of the DC link capacitor C may be performed via power received from the battery 230. In this case, the plurality of lower arm switching elements Q'a and Q'b of the switching module IBT may not operate. Thus, path Ipath1 may bypass the lower arm switching elements Q'a and Q'b.

Alternatively, at least some of the plurality of lower arm switching elements Q'a and Q'b of the switching module IBT may perform switching operations (turn-on and turn-off operations). In this case, the first inductor L1, at least some of the plurality of lower arm switching elements Q'a and Q'b of the switching module IBT, and the second diode D2 may operate as a boost converter. For example, DC power from the battery 230 may be directed in a boost path via lower arm switching elements Q'a and Q'b. Accordingly, the boosted voltage from the battery 230 and the lower arm switching elements Q'a and Q'b may be transferred to the DC link capacitor C.

Figure 7:
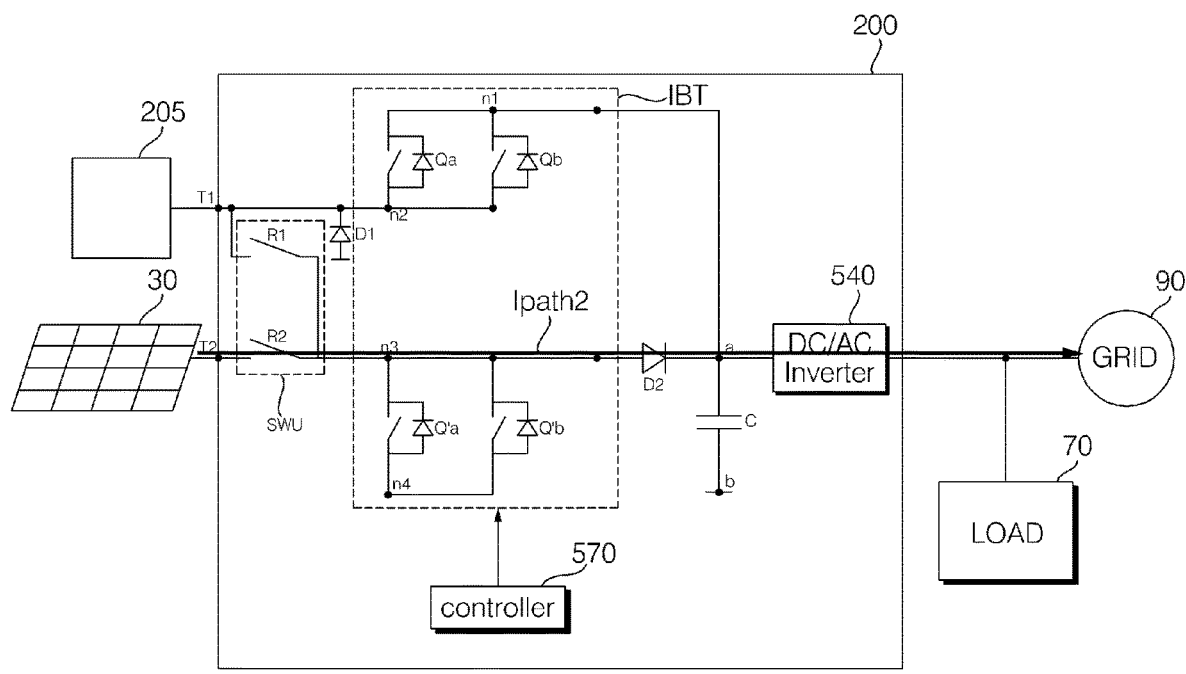

Next, FIG. 7 is a view showing a power generation mode of the power converting device 200. Referring to the drawing, the controller 570 may control the first relay element R1 to be turned off and the second relay element R2 to be turned on. When the first relay element R1 is turned off and the second relay element R2 is turned on, the second DC voltage of the power generation device 30 is transmitted to the DC link capacitor C through the second inductor L2, the second relay element R2, the third node n3, and the second diode D2, according to the current path of Ipath2.

In this case, when the inverter 540 operates in the forward direction, the DC voltage of the DC link capacitor C may be converted to AC voltage and supplied to the grid 90 or the load 70. That is, according to the power generation mode of the power generation device 30, the DC voltage of the power generation device 30 may be converted by the power converting device 200, and the converted power may be output to the outside through the DC link capacitor C and the inverter 540.

Meanwhile, at least some of the plurality of lower arm switching elements Q'a and Q'b of the switching module IBT may perform switching operations (turn-on and turn-off operations) in a state in which the first relay element R1 is turned off and the second relay element R2 is turned on (e.g., in the power generation mode). In this case, the second inductor L2, at least some of the plurality of lower arm switching elements Q'a and Q'b of the switching module IBT, and the second diode D2 may operate as a boost converter. Accordingly, the boosted voltage from power generation device 30 may be transferred to the DC link capacitor C.

Figure 8:
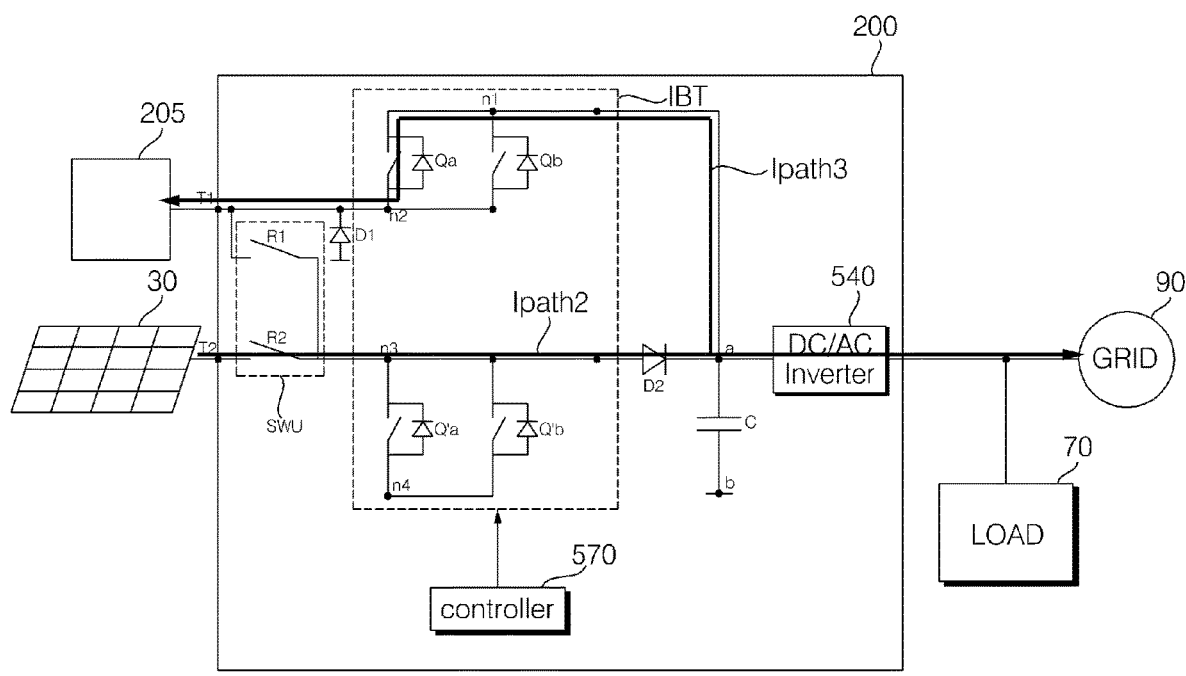

Next, FIG. 8 is a view illustrating a battery charging mode of the power converting device 200. Referring to the drawing, the controller 570 may control the first relay element R1 to be turned off and the second relay element R2 to be turned on. As previously described with respect to FIG. 7, when the first relay element R1 is turned off and the second relay element R2 is turned on, in accordance with the current path of Ipath2, the second DC voltage the power generation device 30 is transmitted to the DC link capacitor C through the second inductor L2, the second relay element R2, the third node n3, and the second diode D2. In this case, when the inverter 540 operates in the forward direction, the DC voltage of the DC link capacitor C may be converted to AC voltage and supplied to the grid 90 or the load 70. That is, according to the power generation mode of the power generation device 30, the DC voltage of the power generation device 30 may be converted by the power converting device 200 and outputted through the DC link capacitor C and the inverter 540.

Meanwhile, at least some of the plurality of lower arm switching elements Q'a and Q'b of the switching module IBT may perform switching operations (turn-on and turn-off operations) in a state in which the first relay element R1 is turned off and the second relay element R2 is turned on (e.g., power from power generation device 30 is provided to the DC link capacitor C). In this case, the second inductor L2, at least some of the plurality of lower arm switching elements Q'a and Q'b of the switching module IBT, and the second diode D2 may operate as a boost converter. Accordingly, the boosted voltage from power generation device 30 may be transferred to the DC link capacitor C.

Meanwhile, when the first relay element R1 is turned off and the second relay element R2 is turned on, the DC voltage stored in the DC link capacitor C may also be supplied to the battery 205 through the first node n1 of the switching module IBT and the first inductor L1, according to the current path of Ipath3 during the charging mode. For example, at least some of the plurality of upper arm switching elements Qa and Qb of the switching module IBT are performing switching operations (e.g., turn-on and turn-off operations) while the first relay element R1 is turned off and the second relay element R2 is turned on. In this case, at least some of the plurality of upper arm switching elements Qa and Qb of the switching module IBT, the first inductor L1, and the first diode D1 may operate as a buck converter, and accordingly, a stepped down voltage may be supplied to the battery 205.

Figure 9:
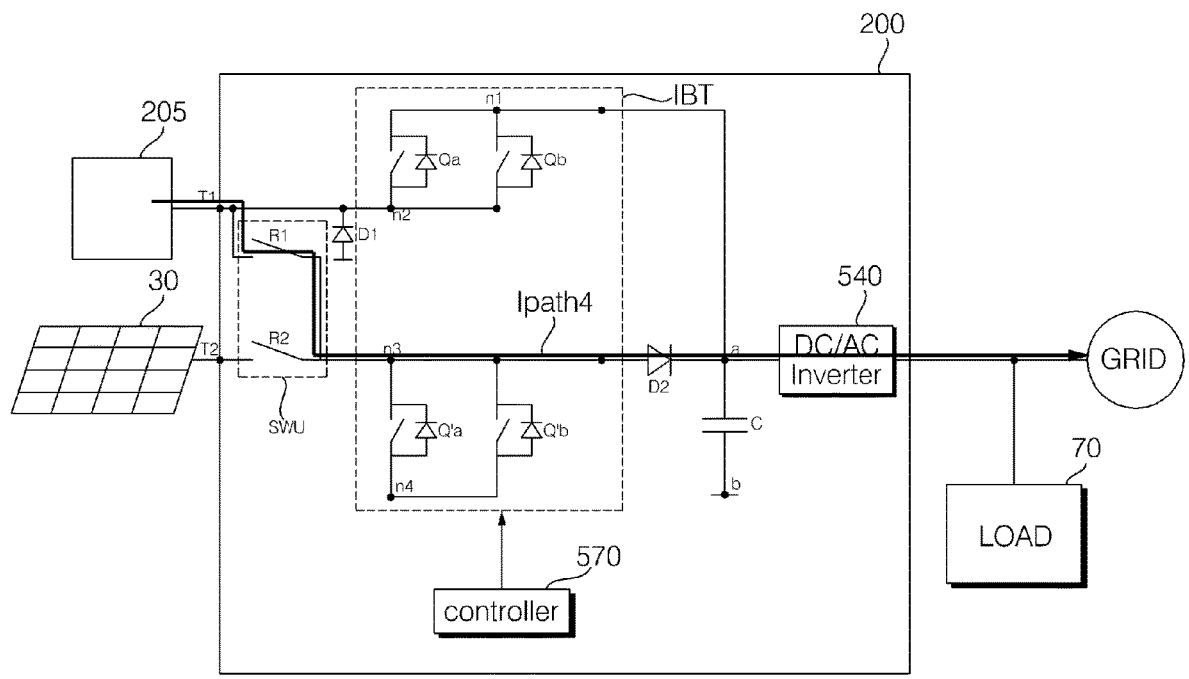

Next, FIG. 9 is a view illustrating a battery discharging mode of the power converting device 200. Referring to the drawing, the controller 570 may control the first relay element R1 to be turned on and the second relay element R2 to be turned off. When the inverter 540 operates in the forward direction in a state in which the first relay element R1 is turned on and the second relay element R2 is turned off, the first DC voltage of the battery 205 is converted to AC voltage through the first inductor L1, the first relay element R1, the third node n3, the second diode D2, the DC link capacitor C, and the inverter 450 according to the current path of Ipath4, the converted power may be supplied to the grid 90 or the load 70. That is, according to the discharging mode of the battery 205, the DC voltage of the battery 205 may be converted by the power converter 200, and may be output to the outside through the DC link capacitor C and the inverter 540.

Meanwhile, at least some of the plurality of lower arm switching elements Q'a and Q'b of the switching module IBT may perform switching operations (turn-on and turn-off operations) in a state in which the first relay element R1 is turned on and the second relay element R2 is turned off. In this case, the second inductor L2, at least some of the plurality of lower arm switching elements Q'a and Q'b of the switching module IBT, and the second diode D2 may operate as a boost converter. Accordingly, the boosted voltage may be transferred to the DC link capacitor C.

Figure 10:
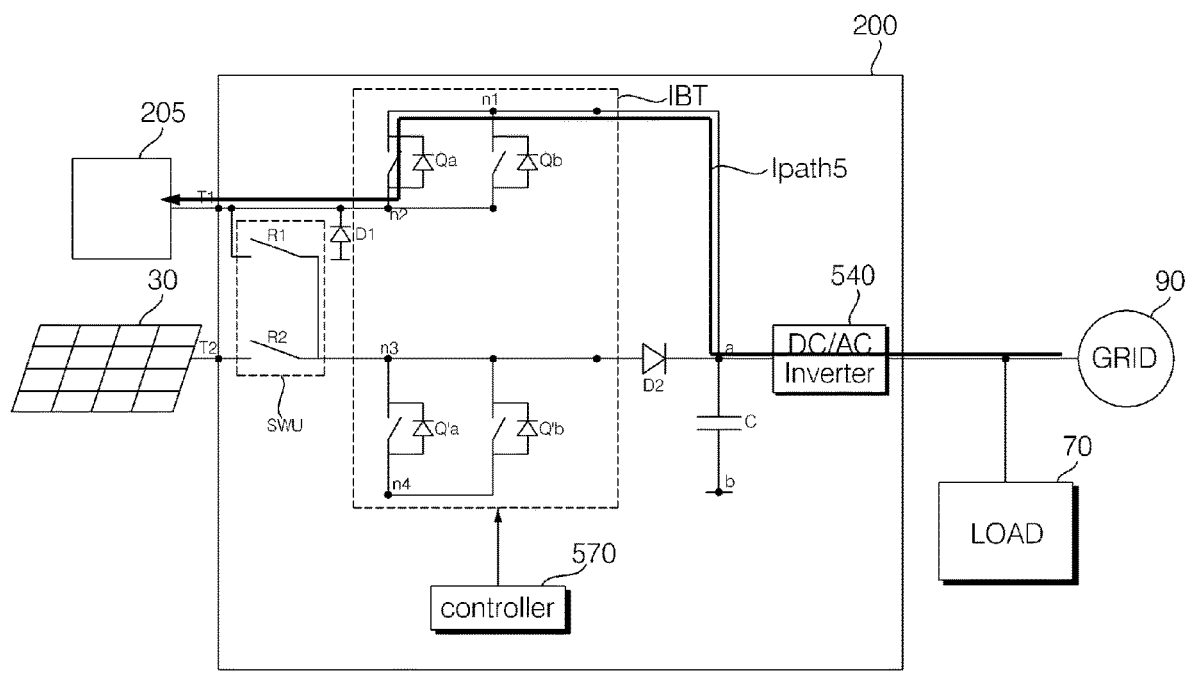

Next, FIG. 10 is a view showing a grid charging mode of the power converting device 200 (e.g., AC power from the grid 90 is received and converted by the power converting device 200 to charge the battery 205). Referring to the drawings, the controller 570 may control the inverter 540 to operate in a reverse direction in a state in which the first relay element R1 is turned off and the second relay element R2 is turned off (e.g., similar to the standby mode).

For example, the controller 570 may control the grid charging mode to be performed when the voltage of the battery 205 is less than a reference value or in an emergency situation or when a voltage from power generation device 30 is less than a threshold value.

When the inverter 540 operates in the reverse direction in a state in which the first relay element R1 is turned off and the second relay element R2 is turned off, the converted DC voltage from the grid 90 may be supplied to the battery 205 through the inverter 540, the DC link capacitor C, the first node n1 of the switching module IBT, and the first inductor L1 according to the current path of Ipath5. That is, the AC voltage of the grid 90 is converted to DC voltage by the reverse operation of the inverter 540, and the converted DC voltage may be supplied to the battery 205 through the DC link (a-b), the first node n1 of the switching module IBT the first inductor L1.

At this time, at least some of the plurality of upper arm switching elements Qa and Qb of the switching module IBT may perform switching operations (turn-on and turn-off operations). In this case, at least some of the plurality of upper arm switching elements Qa and Qb of the switching module IBT, the first inductor L1, and the first diode D1 may operate as a buck converter to step-down the DC link voltage, and accordingly, the stepped down voltage may be supplied to the battery 205.

As a result, comprehensively referring to FIGS. 6 to 10, when the first relay element R1 is turned off and the second relay element R2 is turned on, the DC voltage converted through the second relay element R2, and the third node n3 may be output to the DC link capacitor C, or the DC voltage stored in the DC link capacitor C may be charged into the battery 205 through the first node n1. Accordingly, it is possible to perform a discharging mode or a charging mode of the battery 205 by using the compact power converting device 200.

Meanwhile, when the first relay element R1 is turned on and the second relay element R2 is turned off, the DC voltage converted through the first relay element R1 and the third node n3 may be output to the DC link capacitor C. Accordingly, it is possible to operate the common switching module IBT even for a plurality of DC voltage sources.

Meanwhile, when the first and second lower arm switching elements Q'a and Q'b respectively perform switching in a state in which the first relay element R1 is turned on and the second relay element R2 is turned off, the first DC voltage is boosted and the boosted voltage is output to the DC link capacitor C. Accordingly, it is possible to perform the discharging mode of the battery 205 by using the compact power converting device 200.

Meanwhile, when the first and second lower arm switching elements Q'a and Q'b respectively perform switching in a state in which the first relay element R1 is turned off and the second relay element R2 is turned on, the second DC voltage is boosted and the boosted voltage is output to the DC link capacitor C. Accordingly, it is possible to perform the power generation mode of the power generation device 30 by using the compact power converting device 200.

Meanwhile, when the first and second lower arm switching elements Q'a and Q'b are turned on, respectively, while the first relay element R1 is turned off and the second relay element R2 is turned on, energy is stored in the second inductor L2, and when the first and second lower arm switching elements Q'a and Q'b are turned off, respectively, the boosted voltage boosted based on the second DC voltage and the second the energy stored in inductor L2 is output to the DC link capacitor C. Accordingly, it is possible to perform the power generation mode of the power generation device 30 by using the compact power converting device 200.

Meanwhile, when the first and second upper arm switching elements Qa and Qb respectively perform switching in a state in which the first relay element R1 is turned off and the second relay element R2 is turned on, the DC voltage stored in the DC link capacitor C is converted, and the converted DC voltage is output to the battery 205. Accordingly, it is possible to perform the charging mode of the battery 205 by using the compact power converting device 200.

Meanwhile, when the first and second upper arm switching elements Qa and Qb are turned on, respectively, in a state in which the first relay element R1 is turned off and the second relay element R2 is turned on, energy is stored in the first inductor L1, and when the first and second upper arm switching elements Qa and Qb are turned off, respectively, a stepped down voltage based on the energy stored in the first inductor L1 is transferred to the battery 205 is output. Accordingly, it is possible to perform the charging mode of the battery 205 by using the compact power converting device 200.

Meanwhile, when the first relay element R1 is turned off, the second relay element R2 is turned on, and the first and second upper arm switching elements Qa and Qb are turned on, respectively, in a state in which the bidirectional inverter 540 operates, the AC voltage from the external grid 90 is converted and the converted DC voltage is stored in the DC link (a-b terminal), energy is stored in the first inductor L1, and when the two upper arm switching elements Qa and Qb are turned off, respectively, a voltage reduced based on the energy stored in the first inductor L1 is output to the battery 205. Accordingly, it is possible to perform the grid charging mode by using the compact power converting device 200.

Meanwhile, the switching module IBT may all operate in the power generation mode of the power generation device 30, in the charging mode of the battery 205, in the discharging mode of the battery 205, or in the grid charging mode. Accordingly, since the common switching module IBT may be operated even for a plurality of DC voltage sources, a compact power converting device 200 may be implemented.

A power converting device and energy storage apparatus according to an embodiment of the present disclosure comprises a first input terminal configured to receive a first DC voltage from a battery, a second input terminal configured to receive a second DC voltage from a power generation device, a switching module including a plurality of upper arm switching elements and a plurality of lower arm switching elements, and configured to output DC voltage to a DC link by switching the first DC voltage or the second DC voltage, and a DC link capacitor disposed at the DC link, wherein at least some of the plurality of lower arm switching elements of the switching module operate in a power generation mode of the power generation device, and at least some of the plurality of upper arm switching elements of the switching module operate in a charging mode of the battery. Accordingly, a common switching module may be operated even for a plurality of DC voltage sources. In addition, it is possible to implement a compact power converting device for a plurality of DC voltage sources.

Meanwhile, at least some of the plurality of upper arm switching elements of the switching module, or at least some of the plurality of lower arm switching elements of the switching module operate in a discharging mode of the battery. Accordingly, a common switching module may be operated even for a plurality of DC voltage sources.

Meanwhile, a power converting device and energy storage apparatus according to an embodiment of the present disclosure further comprises a first relay element disposed between the first input terminal and the switching module, a second relay element disposed between the second input terminal and the switching module. Accordingly, a common switching module may be operated even for a plurality of DC voltage sources.

Meanwhile, the switching module comprises first and second upper arm switching elements connected in parallel between a first node and a second node, first and second lower arm switching elements connected in parallel between a third node and a fourth node, and one ends of the first and second relay elements are commonly connected to the third node in the switching module, when the first relay element is turned off and the second relay element is turned on, a DC voltage converted through the second relay element and the third node is output to the DC link capacitor, or a DC voltage stored in the DC link capacitor, through the first node, charges the battery. Accordingly, it is possible to perform a discharging mode or a charging mode of the battery using a compact power converting device.

Meanwhile, when the first relay element is turned on and the second relay element is turned off, a DC voltage converted through the first relay element and the third node is output to the DC link capacitor. Accordingly, a common switching module may be operated even for a plurality of DC voltage sources.

Meanwhile, a power converting device and energy storage apparatus according to an embodiment of the present disclosure further comprises a first inductor disposed between the first input terminal and the second node, a second inductor disposed between the second input terminal and the third node, a first diode disposed between the second node and a ground; and a second diode disposed between the third node and one end of the DC link capacitor. Accordingly, a common switching module may be operated even for a plurality of DC voltage sources.

Meanwhile, when the first and second lower arm switching elements each perform switching in a state in which the first relay element is turned on and the second relay element is turned off, a voltage boosted by boosting the first DC voltage is output to the DC link capacitor. Accordingly, a common switching module may be operated even for a plurality of DC voltage sources.

Meanwhile, when the first and second lower arm switching elements each perform switching in a state in which the first relay element is turned off and the second relay element is turned on, a voltage boosted by boosting the second DC voltage is output to the DC link capacitor. Accordingly, it is possible to perform a power generation mode of a power generation device using a compact power converting device.

Meanwhile, when the first and second lower arm switching elements are turned on and the second relay element is turned on in a state in which the first relay element is turned off respectively, energy is stored in the second inductor, and when the first and second lower arm switching elements are turned off respectively, a boosted voltage by boosting based on the second DC voltage and energy stored in the second inductor is output to the DC link capacitor. Accordingly, it is possible to perform a power generation mode of a power generation device using a compact power converting device.

Meanwhile, when the first and second upper arm switching elements each perform switching in a state in which the first relay element is turned off and the second relay element is turned on, DC voltage stored in the DC link capacitor is converted, and the converted DC voltage is output to the battery. Accordingly, it is possible to perform a charging mode of the battery using a compact power converting device.

Meanwhile, when the first and second upper arm switching elements are turned on and the second relay element is turned on in a state in which the first relay element is turned off respectively, energy is stored in the first inductor, and when the first and second upper arm switching elements are turned off respectively, a voltage stepped down based on energy stored in the first inductor is output to the battery. Accordingly, it is possible to perform a charging mode of the battery using a compact power converting device.

Meanwhile, a power converting device and energy storage apparatus according to an embodiment of the present disclosure further comprises a bidirectional inverter configured to convert and output the DC voltage of the DC link into AC voltage or to convert external AC voltage to DC voltage. Accordingly, since a common switching module may be operated even for a plurality of DC voltage sources, it is possible to implement a compact power converting device.

Meanwhile, at least some of the plurality of upper arm switching elements of the switching module are operated in a grid charging mode or the charging mode of the battery. Accordingly, since a common switching module may be operated even for a plurality of DC voltage sources, it is possible to implement a compact power converting device.

Meanwhile, in a state in which the bidirectional inverter is operated, AC voltage from an external grid is converted and the converted DC voltage is stored in the DC terminal, the first relay element is turned off, and the second relay element is turned on, when the first and second upper arm switching elements are turned on respectively, energy is stored in the first inductor, and when the first and second upper arm switching elements are turned off respectively, a voltage stepped down based on energy stored in the first inductor is output to the battery. Accordingly, it is possible to perform a grid discharging mode or a charging mode of the battery using a compact power converting device.

Meanwhile, the switching modules are operated in the power generation mode of the power generation device, in the charging mode of the battery, in a discharging mode of the battery, or in a grid charging mode. Accordingly, since a common switching module may be operated even for a plurality of DC voltage sources, it is possible to implement a compact power converting device.

A power converting device according to another embodiment of the present disclosure comprises a first input terminal configured to receive a first DC voltage from the battery, a second input terminal configured to receive a second DC voltage from a power generation device, a switching module including a plurality of upper arm switching elements and a plurality of lower arm switching elements, and configured to output DC voltage to a DC link by switching the first DC voltage or the second DC voltage, and, a DC link capacitor disposed at the DC link, wherein at least some of the plurality of upper arm switching elements of the switching module operate in a grid charging mode. Accordingly, since a common switching module may be operated even for a plurality of DC voltage sources, it is possible to implement a compact power converting device.

The power converting device and the energy storage apparatus including the same according to an embodiment of the present disclosure are not limited to the configuration and method of the embodiments described above, but the above embodiments may be configured by selectively combining all or part of each of the embodiments so that various modifications can be achieved.

As aspect of the present disclosure provides a power converting device capable of operating a common switching module even for multiple DC voltage sources, and energy storage apparatus including the same. Another aspect of the present disclosure provides a compact power converting device for a plurality of DC voltage sources, and energy storage apparatus including the same.

A power converting device and energy storage apparatus according to an embodiment of the present disclosure comprises a first input terminal configured to receive a first DC voltage from a battery, a second input terminal configured to receive a second DC voltage from a power generation device, a switching module including a plurality of upper arm switching elements and a plurality of lower arm switching elements, and configured to output DC voltage to a DC link by switching the first DC voltage or the second DC voltage, and, a DC link capacitor disposed at the DC link, wherein at least some of the plurality of lower arm switching elements of the switching module operate in a power generation mode of the power generation device, and at least some of the plurality of upper arm switching elements of the switching module operate in a charging mode of the battery. Meanwhile, at least some of the plurality of upper arm switching elements of the switching module, or at least some of the plurality of lower arm switching elements of the switching module operate in a discharging mode of the battery. Meanwhile, a power converting device and energy storage apparatus according to an embodiment of the present disclosure further comprises a first relay element disposed between the first input terminal and the switching module, a second relay element disposed between the second input terminal and the switching module.

Meanwhile, the switching module comprises first and second upper arm switching elements connected in parallel between a first node and a second node, first and second lower arm switching elements connected in parallel between a third node and a fourth node, and one ends of the first and second relay elements are commonly connected to the third node in the switching module, when the first relay element is turned off and the second relay element is turned on, a DC voltage converted through the second relay element and the third node is output to the DC link capacitor, or a DC voltage stored in the DC link capacitor, through the first node, charges the battery.

Meanwhile, when the first relay element is turned on and the second relay element is turned off, a DC voltage converted through the first relay element and the third node is output to the DC link capacitor. Meanwhile, a power converting device and energy storage apparatus according to an embodiment of the present disclosure further comprises a first inductor disposed between the first input terminal and the second node, a second inductor disposed between the second input terminal and the third node, a first diode disposed between the second node and a ground; and a second diode disposed between the third node and one end of the DC link capacitor.

Meanwhile, when the first and second lower arm switching elements each perform switching in a state in which the first relay element is turned on and the second relay element is turned off, a voltage boosted by boosting the first DC voltage is output to the DC link capacitor. Meanwhile, when the first and second lower arm switching elements each perform switching in a state in which the first relay element is turned off and the second relay element is turned on, a voltage boosted by boosting the second DC voltage is output to the DC link capacitor.

Meanwhile, when the first and second lower arm switching elements are turned on and the second relay element is turned on in a state in which the first relay element is turned off respectively, energy is stored in the second inductor, and when the first and second lower arm switching elements are turned off respectively, a boosted voltage by boosting based on the second DC voltage and energy stored in the second inductor is output to the DC link capacitor. Meanwhile, when the first and second upper arm switching elements each perform switching in a state in which the first relay element is turned off and the second relay element is turned on, DC voltage stored in the DC link capacitor is converted, and the converted DC voltage is output to the battery. Meanwhile, when the first and second upper arm switching elements are turned on and the second relay element is turned on in a state in which the first relay element is turned off respectively, energy is stored in the first inductor, and when the first and second upper arm switching elements are turned off respectively, a voltage stepped down based on energy stored in the first inductor is output to the battery.

Meanwhile, a power converting device and energy storage apparatus according to an embodiment of the present disclosure further comprises a bidirectional inverter configured to convert and output the DC voltage of the DC link into AC voltage, or converts external AC voltage to DC voltage. Meanwhile, at least some of the plurality of upper arm switching elements of the switching module are operated in a grid charging mode or the charging mode of the battery.

Meanwhile, in a state in which the bidirectional inverter is operated, AC voltage from an external grid is converted and the converted DC voltage is stored in the DC terminal, the first relay element is turned off, and the second relay element is turned on, when the first and second upper arm switching elements are turned on respectively, energy is stored in the first inductor, and when the first and second upper arm switching elements are turned off respectively, a voltage stepped down based on energy stored in the first inductor is output to the battery. Meanwhile, the switching modules are operated in the power generation mode of the power generation device, in the charging mode of the battery, in a discharging mode of the battery, or in a grid charging mode.

A power converting device according to another embodiment of the present disclosure comprises a first input terminal configured to receive a first DC voltage from the battery, a second input terminal configured to receive a second DC voltage from a power generation device, a switching module including a plurality of upper arm switching elements and a plurality of lower arm switching elements, and configured to output DC voltage to a DC link by switching the first DC voltage or the second DC voltage, and a DC link capacitor disposed at the DC link, wherein at least some of the plurality of upper arm switching elements of the switching module operate in a grid charging mode.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A power converting device comprising:
a first input terminal electrically coupled to a battery;
a second input terminal electrically coupled to a power generation device;

a switching module including a plurality of upper arm switching elements connected in parallel between a first node and a second node and a plurality of lower arm switching elements connected in parallel between a third node and a fourth node, and configured to switch between at least one of a first DC voltage between the first input terminal and a direct current (DC) terminal and a second DC voltage between the second input terminal and the DC terminal;

a DC link capacitor provided at the DC terminal;

a first relay switch provided between the first input terminal and the switching module; and a second relay switch provided between the second input terminal and the switching module, wherein each of the first relay switch and the second relay switch is electrically connected to the third node, wherein the first input terminal and the DC terminal are electrically connected via at least one of the plurality of lower arm switching elements when the switching module operates to receive power from the power generation device, and wherein the second input terminal and the DC terminal are electrically connected via at least one of the plurality of upper arm switching elements when the switching module operates to charge the battery.

2. The power converting device according to claim 1, wherein the switching module is configured to provide a current path via at least one of the plurality of upper arm switching elements of the switching module or at least one of the plurality of lower arm switching elements when switching module operates to receive power from the battery.

3. The power converting device according to claim 1, further comprising:

wherein the upper arm switching elements include first and second upper arm switching elements connected in parallel between the first node of the switching element and the second node of the switching element, wherein the lower arm switching elements include first and second lower arm switching elements connected in parallel between the third node of the switching element and the fourth node of the switching element, wherein when the first relay switch is turned off and the second relay switch is turned on, DC voltage is directed through the second relay element and the third node to be stored in the DC link capacitor, or DC voltage stored in the DC link capacitor is directed through the first node to charge the battery.

4. The power converting device according to claim 1, wherein when the first relay switch is turned on and the second relay switch is turned off, DC voltage is directed through the first relay switch and the third node to be stored in the DC link capacitor.

5. The power converting device according to claim 1, further comprising:

a first inductor provided between the first input terminal and the second node;

a second inductor provided between the second input terminal and the third node;

a first diode provided between the second node and a ground; and a second diode provided between the third node and the DC link capacitor.

6. The power converting device according to claim 5, wherein the first and second lower arm switching elements are configured to be switched while the first relay switch is turned on and the second relay switch is turned off, such that the first DC voltage is boosted, and the boosted first DC voltage provided outputted to the DC link capacitor.

7. The power converting device according to claim 5, wherein the first and second lower arm switching elements are configured to be switched while the first relay switch is turned off and the second relay switch is turned on, such that the second DC voltage is boosted, and the boosted second DC voltage is outputted to the DC link capacitor.

8. The power converting device according to claim 7, wherein:

when the first and second lower arm switching elements are turned on while the second relay switch is turned on in and the first relay switch is turned off, energy is stored in the second inductor, and when the first and second lower arm switching elements are turned off, the second DC voltage is boosted based on the energy stored in the second inductor.

9. The power converting device according to claim 5, wherein the first and second upper arm switching elements are configured to be switched while the first relay switch is turned off and the second relay switch is turned on, such that DC voltage stored in the DC link capacitor is converted, and the converted DC voltage is outputted to the battery.

10. The power converting device according to claim 9, wherein when the first and second upper arm switching elements are turned on while the second relay switch is turned on and the first relay switch is turned off, energy is stored in the first inductor, and when the first and second upper arm switching elements are subsequently turned off, a stepped down voltage based on the energy stored in the first inductor is outputted to the battery.

11. The power converting device according to claim 1, further comprising a bidirectional inverter configured to convert DC voltage of the DC terminal into alternating current (AC) voltage and to convert external AC voltage to DC voltage to be received at the DC terminal.

12. The power converting device according to claim 11, wherein at least one of the plurality of upper arm switching elements of the switching module is switched to direct power from the DC terminal to the battery when charging the battery based on at least one of the second DC voltage or the external AC voltage.

13. The power converting device according to claim 5, further comprising a bidirectional inverter configured to convert DC voltage of the DC terminal into AC voltage and to convert external AC voltage to DC voltage, wherein when the bidirectional inverter converts the external AC voltage to DC voltage that is provided at the DC terminal while the first relay switch is turned off and the second relay switch is turned on, the first and second upper arm switching elements are turned on, energy is stored in the first inductor, and when the first and second upper arm switching elements are turned off respectively, a stepped-down voltage based on energy stored in the first inductor is outputted to the battery.

14. The power converting device according to claim 9, wherein the upper arm switching elements and the lower arm switching elements are operated when the switching module operates to receive power generated by the power generation device, operates to charge the battery based on the power generated by the power generation device, operates to receive power discharged from the battery, or operates to charge the battery based on externally received AC power.

15. An energy storage apparatus comprising:
a battery; and
a power converting device configured to receive direct current (DC) voltage from a power generation device or from the battery, charge the battery based on the received DC voltage from the power generation device, and convert the received DC voltage and output the converted voltage,
wherein the power converting device includes:
a first input terminal electrically coupled to the battery;
a second input terminal electrically coupled to the power generation device; and
a switching module including a plurality of upper arm switching elements connected in parallel between a first node and a second node and a plurality of lower arm switching elements connected in parallel between a third node and a fourth node, and configured to switch between at least one of a first DC voltage between the first input terminal and a DC link capacitor and a second DC voltage between the second input terminal and the DC link capacitor;
a first relay switch provided between the first input terminal and the switching module; and
a second relay switch provided between the second input terminal and the switching module, and
wherein each of the first relay switch and the second relay switch is electrically connected to the third node, and
wherein DC voltage to charge the battery is provided by the DC link capacitor to the battery via at least one of the plurality of upper arm switching elements of the switching module.

16. The energy storage apparatus according to claim 15, further comprising a bidirectional inverter configured to convert and output the DC voltage at the DC link capacitor into alternating current (AC) voltage and to convert external AC voltage to DC voltage.

17. An energy storage apparatus comprising:
a battery; and
a power converting device configured to receive a direct current (DC) voltage from a power generation device or the battery, perform power conversion of the DC voltage, charge the battery, and supply voltage according to the power conversion,
wherein the power converting device includes:
a first input terminal electrically coupled to the battery;
a second input terminal electrically coupled to the power generation device;
a switching module including a plurality of upper arm switching elements connected in parallel between a first node and a second node and a plurality of lower arm switching elements connected in parallel between a third node and a fourth node, and configured to switch between at least one of a first DC voltage between the first input terminal and a DC link capacitor and a second DC voltage between the second input terminal and the DC link capacitor;
a first inductor provided between the first input terminal and the second node:
a second inductor provided between the second input terminal and the third node;
a first diode provided between the second node and a ground; and
a second diode provided between the third node and the DC link capacitor,
wherein at least one of the plurality of lower arm switching elements of the switching module is switched on when the power converting device receives DC voltage from the power generation device, and
wherein at least one of the plurality of upper arm switching elements of the switching module is switched on when the power converting device charges the battery.

18. The energy storage apparatus according to claim 17, wherein at least one of the plurality of upper arm switching elements of the switching module or at least one of the plurality of lower arm switching elements of the switching module is switched on when the power converting device receives DC voltage from the battery.

19. The energy storage apparatus according to claim 17, further comprising:
a first relay switch provided between the first input terminal and the switching module; and
a second relay switch provided between the second input terminal and the switching module,
wherein the upper arm switching elements include first and second upper arm switching elements connected in parallel between the first node of the switching module and the second node of the switching module,
wherein the lower arm switching elements include first and second lower arm switching elements connected in parallel between the third node of the switching module and the fourth node of the switching module,
wherein the first and second relay elements are electrically connected to the third node in the switching module, and
wherein when the first relay switch is turned off and the second relay switch is turned on, a DC voltage is provided through the second relay switch and the third node and is outputted to the DC link capacitor, or a DC voltage stored in the DC link capacitor is provided through the first node to charge the battery.

* * * * *